H. C. COMER.
SELF FEEDER EXTENSION FOR THRESHING MACHINES.
APPLICATION FILED MAY 11, 1914.
1,198,701.
Patented Sept. 19, 1916.
2 SHEETS—SHEET 1.
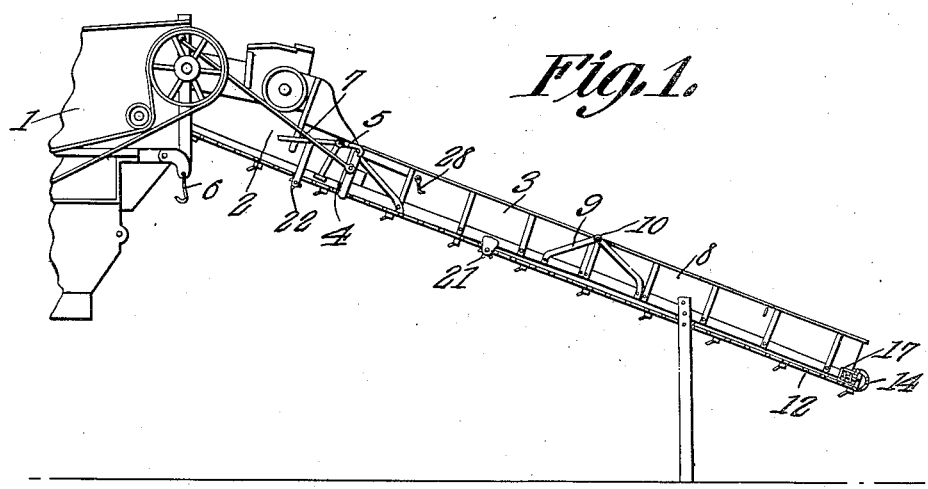
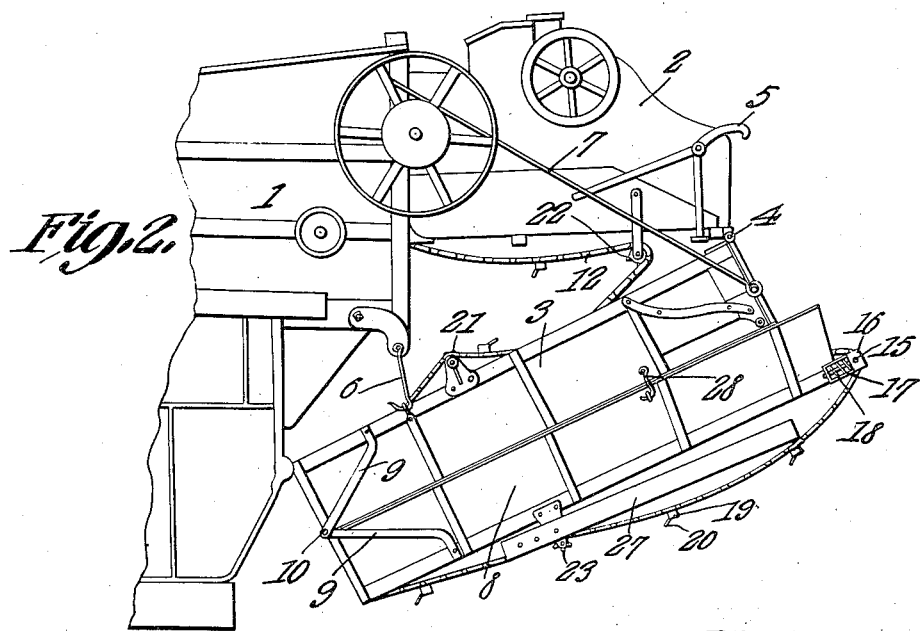

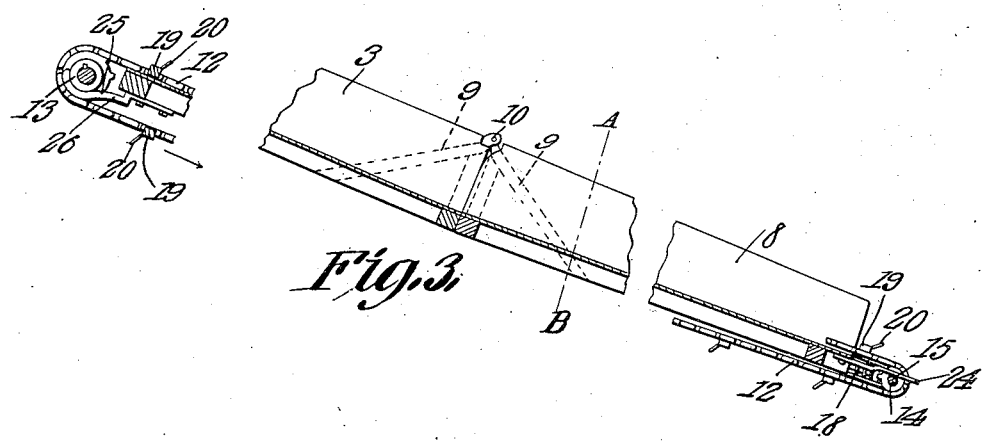
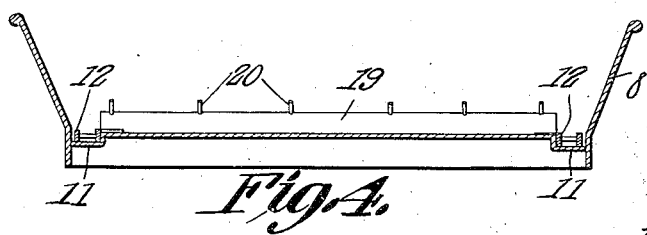
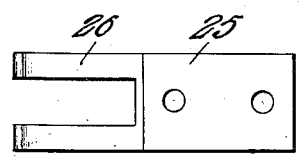
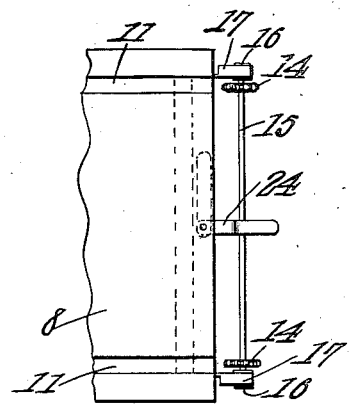

UNITED STATES PATENT OFFICE.

HEBER CARTER COMER, OF LEHI, UTAH.

SELF-FEEDER EXTENSION FOR THRESHING-MACHINES.

1,198,701.  Specification of Letters Patent.  Patented Sept. 19, 1916.

Application filed May 11, 1914. Serial No. 837,918.

*To all whom it may concern:*

Be it known that I, HEBER CARTER COMER, a citizen of the United States, residing at Lehi city, in the county of Utah and State of Utah, have invented a new and useful Self-Feeder Extension for Threshing-Machines, of which the following is a specification.

This invention relates to extensions for the self feeders of threshing machines.

One of the objects of the present invention is to provide an extension which is hingedly connected to the feeder and which is of the same width as the feeder so that a smooth unbroken surface is provided along the feeder and its extension, thus preventing loss of grain between the meeting ends of the feeder and its extension and also insuring the uniform feeding of material to the machine and, consequently, increasing the efficiency and capacity.

A further object is to provide an extension which does not require a separate support while in use and which, while not in use, can be folded back against the threshing machine and readily transported from place to place with the machine.

Another object is to provide an extension in which travels the same conveyer chain as is used within the feeder, means being provided whereby this chain will be held in place while the structure is being folded or unfolded, without danger of becoming tangled.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a side elevation of a portion of a threshing machine and showing the feeder and its extension applied thereto. Fig. 2 is an enlarged side elevation of the feeder and extension folded against the threshing machine, a portion of said machine being illustrated. Fig. 3 is a longitudinal section through the feeder and extension, parts being broken away. Fig. 4 is an enlarged transverse section through the extension, said section being taken on the line A—B Fig. 3. Fig. 5 is a plan view of the rear end portion of the extension, the conveyer chain being removed and the chain holding tongues being shown in engaging position. Fig. 6 is a plan view of one of the chain guides used in connection with the structure.

Referring to the figures by characters of reference 1 designates a portion of a threshing machine having the usual inlet structure 2 to which the trough-like feeder body 3 is hingedly connected as at 4, any suitable means, such as a latch member 5, being provided for engaging the body 3 to support it in extended or active position, as shown in Fig. 1. A hook 6 or the like can be employed for engaging the body 3 when the same is folded inwardly and upwardly as shown in Fig. 2. This body 3 is provided with the usual brace rods 7 for holding it in extended position, as shown in Fig. 1.

The feeder extension constituting the present invention, includes a trough-like body 8 of the same cross sectional contour and proportions as the body 3 and having one end adapted to fit snugly against the outer end of the body 3 so that, when the extension is in active position, its side walls will constitute practical continuations of the side walls of the body 3 while its bottom will be flush with and constitute practically a continuation of the bottom of the body 2.

Secured to the outer faces of the sides of the bodies 3 and 8 are reinforcing straps 9 extending upwardly to the upper meeting corners of the two bodies 3 and 8 where they are pivotally connected so as to form hinge connections between the body 3 of the feeder and the body 8 of the extension. The hinge connections have been indicated generally at 10.

As shown in Fig. 4, the bottom of the body 8 is provided, at each side, with a longitudinally extending shallow channel 11. As before pointed out, the body 8 is of the same cross sectional contour as the body 3. Consequently these channels 11 in the body 8 will register with corresponding channels in the body 3. These channels are designed to receive the upper flights of endless chains 12 which extend around sprockets 13 located adjacent the inlet of the threshing machine and also extend around sprockets 14 secured to a shaft 15 which is journaled, at its ends, in boxes 16 slidably mounted within slotted guides 17 extending from the outer end of the extension body 8. Springs 18 are fitted in these guides and bear against boxes 16, thus serving to hold the boxes pressed toward the outer ends of their guides 17, as shown in Fig. 2.

The chains 12 are connected by cross strips 19 provided with teeth 20 of the usual form whereby a conveyer is produced, the cleats or strips 19 being adapted to slide upwardly along the bottoms of the bodies 3 and 8 thus to guide the grain up to the inlet of the thresher. The lower flights of the chains 12 ride upon idler sprockets 21 supported below and by the body 3. Another idler sprocket 22 can be arranged under each chain at a point under the inlet 2 and each chain 12 can also be trained over an additional idler sprocket 23 supported by and under the extension 8.

A holding tongue 24 is pivotally connected to the bottom of the body 8 at the outer end thereof and is adapted to be shifted either into position under the bottom of the body, as shown by dotted lines in Fig. 5, or to be moved outwardly into the position shown by full lines in said figure and at which time it will engage one of the cross strips or cleats of the conveyer and hold the said conveyer against movement along the bottoms of the bodies 3 and 8. A deflector or guide is preferably arranged adjacent each of the sprockets 13. Each of these deflectors or guides is in the form of a plate 25 having spring fingers 26 which receive the sprocket between them, these fingers fitting close to the hub of the sprocket and being extended between the lower flight of the chain and the sprocket supporting structure, as shown in Fig. 3. Thus it will be seen that the chains are prevented by these fingers 26 from wrapping about the sprockets and becoming entangled. Instead the fingers 26 will force the chains off of the sprocket teeth while the chains are moving in the direction indicated by the arrow in Fig. 3.

When the mechanism herein described is in use, the feeder body 3 is extended as shown in Fig. 1, the same being held in such position by the rod or rods 7 and by the latch or latches 5. Furthermore, the body 8 of the extension is supported in alinement with the body 3 and the feeder body 3 is relieved of the weight of the body 8 by a removable support 27 which may be connected to said body 8. A conveyer made up of the chains 12 and cross strips 13 is operated by the same mechanism as the shorter conveyers which have heretofore been extended solely throughout the length of the body 3 and this conveyer is adapted to entirely displace the shorter conveyer referred to. During the operation of the conveyer the material placed in the body 8 of the extension will be engaged by the conveyer and drawn upwardly along the bottom of said body 8 and onto the bottom of the body 3 and thence into the threshing machine, importance being attached to the fact that there are no spaces between which grain will fall and thus become wasted, and to the further fact that both the extension and the feeder are of the same width so that grain can thus be uniformly supplied to the machine. Should it be desired to fold or collapse the structure, as when the machine is to be moved from place to place, it would merely be necessary to remove the support 27, fold the body 8 upwardly and rearwardly onto the body 3 after moving the locking tongue 24 into engagement with the conveyer, and then to unfasten the body 3 at its upper end so that it will be free to swing downwardly and inwardly to the position shown in Fig. 2, it being understood that the two bodies 3 and 8 are held together by a hook 28 or the like. When the parts are folded to the position shown in Fig. 2, they can be held by the hook 6. It will be seen that by mounting the conveyer in the manner described it can be folded readily without becoming displaced and, by utilizing the holding or fastening tongue 24, the chains will be kept upon the sprockets and parts 10, consequently, be restored to their active positions without any great labor such as would be required should the conveyer chains become displaced or entangled.

What is claimed is:—

The combination with a feeder body for threshing machines, of an extension hingedly connected to and adapted to swing downwardly into position under the body of the feeder and upwardly into alinement therewith, said extension including hingedly connected trough-like sections foldable with their upper edges together when in position under the feeder body, wheels beneath and carried by the feeder body and the sections of the extension, an endless chain mounted upon the wheels and extending throughout the length of the feeder body and the sections of the extension, yieldingly held sprockets carried by the outer end of one of the sections of the extension for taking up slack in the chain, said foldable sections and the wheels carried thereby coöperating to hold the chain against displacement relative thereto when the parts are folded, a tongue pivotally connected to one of the extension sections, and means movable with the chain for engagement by the tongue to hold the chain against longitudinal movement.

In testimony that I claim the foregoing as my own, I have hereto affixed my signature in the presence of two witnesses.

HEBER CARTER COMER.

Witnesses:
W. H. FRITTS,
E. L. BATCHELOR.